US006828802B2

(12) United States Patent
Schulte

(10) Patent No.: US 6,828,802 B2
(45) Date of Patent: Dec. 7, 2004

(54) PRESSURE MEASUREMENT DEVICE INCLUDING A CAPACITIVE SENSOR IN AN AMPLIFIER FEEDBACK PATH

(75) Inventor: John P. Schulte, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 3 days.

(21) Appl. No.: 10/222,260

(22) Filed: Aug. 16, 2002

(65) Prior Publication Data

US 2004/0032268 A1 Feb. 19, 2004

(51) Int. Cl.[7] .............................................. G01R 27/26
(52) U.S. Cl. ...................................... 324/658; 324/676
(58) Field of Search ........................... 73/1.35, 861.42, 73/861.47, 718, 723; 324/656, 658, 676

(56) References Cited

U.S. PATENT DOCUMENTS

| 4,149,231 | A |   | 4/1979  | Bukosky et al. ............... 363/59 |
|-----------|---|---|---------|--------------------------------------|
| 4,187,459 | A |   | 2/1980  | Wolfendale ................... 324/60 |
| 4,322,977 | A | * | 4/1982  | Sell et al. ..................... 73/701 |
| 4,598,381 | A |   | 7/1986  | Cucci .......................... 364/558 |
| 4,743,836 | A |   | 5/1988  | Grzybowski et al. ......... 324/60 |
| 5,028,876 | A |   | 7/1991  | Cadwell ....................... 324/678 |
| 5,870,695 | A |   | 2/1999  | Brown et al. ................ 702/138 |
| 5,899,962 | A |   | 5/1999  | Louwagie et al. ........... 702/138 |
| 5,942,692 | A | * | 8/1999  | Haase et al. .................. 73/724 |
| 5,974,895 | A |   | 11/1999 | Steger et al. ................ 73/769 |
| 6,058,783 | A | * | 5/2000  | Berthold et al. .............. 73/766 |
| 6,089,097 | A |   | 7/2000  | Frick et al. ................... 73/718 |
| 6,465,271 | B1| * | 10/2002 | Ko et al. ....................... 438/48 |
| 6,516,672 | B2| * | 2/2003  | Wang ........................... 73/718 |
| 6,518,880 | B2| * | 2/2003  | Tanizawa ..................... 340/514 |
| 6,529,015 | B2| * | 3/2003  | Nonoyama et al. ......... 324/678 |
| 6,639,414 | B2| * | 10/2003 | Lien ............................ 324/658 |
| 6,744,258 | B2| * | 6/2004  | Ishio et al. .................. 324/548 |

FOREIGN PATENT DOCUMENTS

| JP | 06180336 | 6/1994 |
| JP | 08122180 | 5/1996 |
| JP | 08122181 | 5/1996 |

OTHER PUBLICATIONS

International Search Report for International Application No. PCT/US 03/23575, filed Jul. 28, 2003 with a mailing date of Jan. 30, 2004.

* cited by examiner

Primary Examiner—Anjan Deb
Assistant Examiner—Walter Benson
(74) Attorney, Agent, or Firm—Westman, Champlin & Kelly, P.A.

(57) ABSTRACT

A pressure measurement device that has a digital clock circuit that provides an excitation clock and a control output. An integrator includes a switch controlled by the control output, an amplifier, and a pressure sensing capacitance coupled in an amplifier feedback path. The switch connects across the first pressure sensing capacitance. A reference capacitance that is insensitive to the pressure couples between the excitation clock and the amplifier input. An amplifier output represents the pressure.

27 Claims, 11 Drawing Sheets

US 6,828,802 B2

PRESSURE MEASUREMENT DEVICE INCLUDING A CAPACITIVE SENSOR IN AN AMPLIFIER FEEDBACK PATH

FIELD OF THE INVENTION

The present invention relates generally to industrial pressure measurement devices. In particular, the present invention relates to pressure measurement devices that include a capacitive pressure sensor.

BACKGROUND OF THE INVENTION

Industrial pressure measurement devices, such as transmitters and pressure sensing modules, can be made either with or without embedded microprocessors. Transmitters that include embedded microprocessors typically have remote adjustment capabilities and have higher accuracies, higher linearity and higher costs. Transmitters built using analog or digital circuitry and without an embedded microprocessor usually have lower accuracies, lower linearity and lower costs. Modifications to improve the accuracy and linearity of transmitters by adding complex analog or digital circuitry but without adding embedded microprocessors can result in increased costs, decreased speed, or both.

There is a need to provide a pressure measurement device that can provide improved linearity and accuracy without the added cost of an embedded microprocessor or complex circuitry.

SUMMARY OF THE INVENTION

Disclosed is a pressure measurement device for sensing pressure. The pressure measurement device includes a digital clock circuit that provides an excitation clock and a control output. The pressure measurement device also includes a first integrator.

The first integrator includes a first switch controlled by the control output, a first amplifier, and a capacitive pressure transducer. The capacitive pressure transducer is fluidly couplable to an industrial process. The capacitive pressure transducer has a first pressure sensing capacitance that is electrically coupled in an amplifier feedback path between a first amplifier output and a first amplifier input. The first switch connects across the first pressure sensing capacitance. The first amplifier output represents the pressure.

The pressure measurement device includes a first reference capacitance that is insensitive to the pressure and that couples between the excitation clock and the first amplifier input.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below in FIGS. 1–11, methods and apparatus for sensing pressure in a pressure measurement device are disclosed. The pressure measurement devices includes an integrator with a pressure sensing capacitance that is electrically coupled in an amplifier feedback path between an amplifier output and an amplifier input. A switch connects across the pressure sensing capacitance and periodically rezeros electrical charge on the pressure sensing capacitance. A capacitance that is not sensitive to pressure is coupled between an excitation voltage and the amplifier input. The pressure measurement devices provide speed, linearity and accuracy without the added cost of an embedded microprocessor or additional complex circuitry.

Pressure measurement devices such as transmitters and pressure sensing modules can be made in different configurations so that they mate with coplanar flanges, or mate with two facing flanges or mate with threaded or other know pressure connections. Pressure devices ranging from those that include fluid isolators to those in which capacitive pressure sensors are in direct contact with process fluids can be made. Pressure sensing capacitances can be formed of various types of materials including metals, glass, ceramics, silicon, sapphire, quartz and other known materials used in constructing capacitive pressure sensors. The pressure sensing capacitances can be formed as two separate parts or, if desired, both pressure sensors can be formed in a single substrate, depending on the needs of the application. Electrical circuitry in the pressure devices can include analog, digital, discrete, integrated or custom integrated circuitry and does not require an embedded microprocessor. In one preferred arrangement, the circuitry comprises pressure sensing capacitors formed of sapphire and coupled to an MOS integrated circuit.

Figure 1:
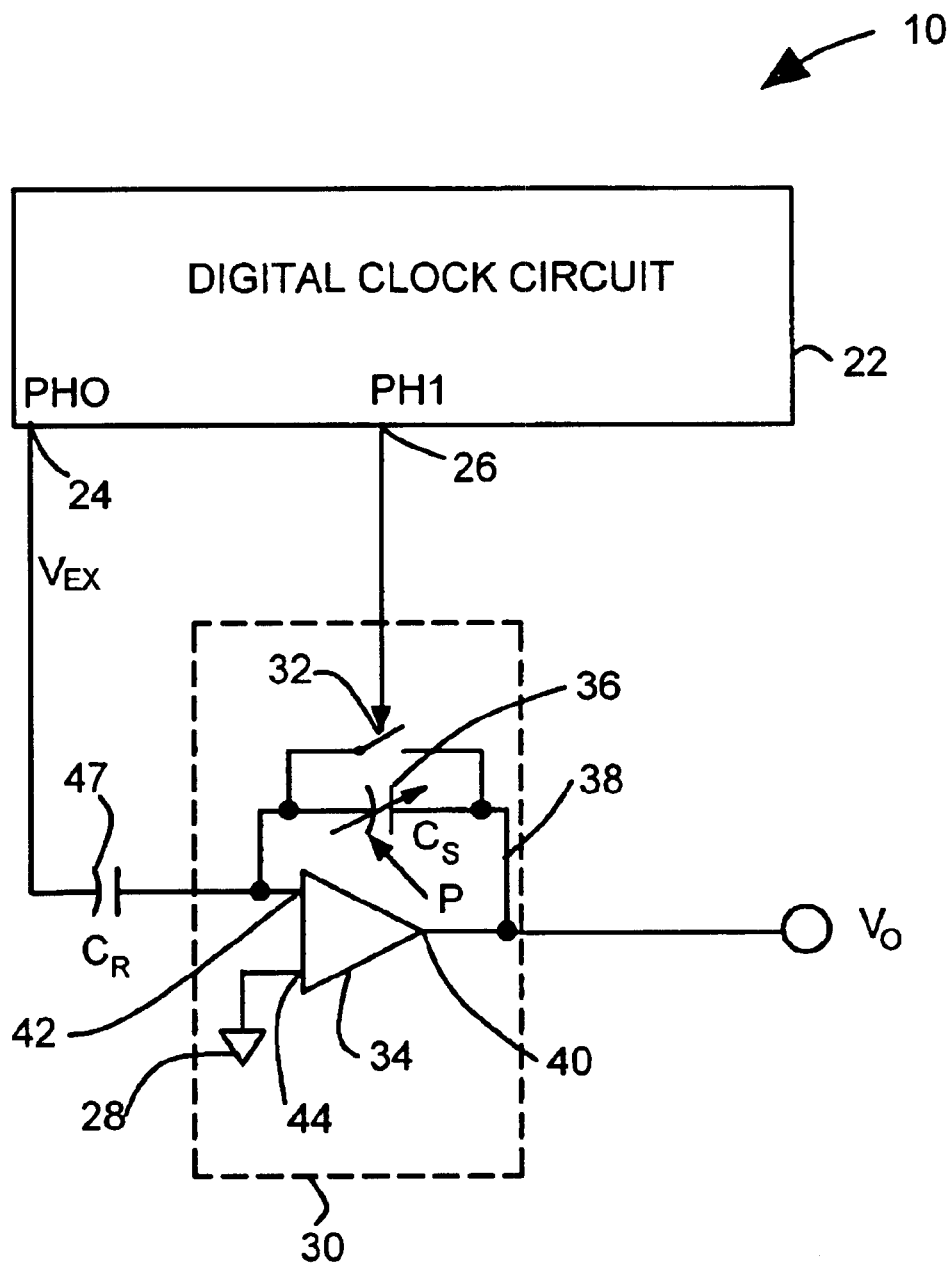
FIG. 1 illustrates a schematic diagram of an embodiment of a pressure measurement device.

FIG. 1 illustrates a schematic diagram of an embodiment of a pressure measurement device 10. One or more pressure measurement devices 10 can be used, for example, in a pressure transmitter for sensing absolute, gage or differential pressure P in an industrial process. The pressure measurement device 10 includes a digital clock circuit 22 that generates an excitation clock 24 (PH0) and a control output 26 (PH1). The digital clock circuit 22 can be made using conventional techniques with MOS switching circuits and each of the outputs PH0 and PH1 has a rectangular waveform that switches between a DC common (zero) level at 28 and a maximum amplitude Vex (peak-to-peak) relative to DC common 28 that is typically a fixed voltage in the range of 2.5–5 volts. The rectangular waveform PH0 is typically out of phase with the rectangular waveform PH1. In one preferred arrangement, the waveforms PH0 and PH1 are overlapping rectangular waves.

A first integrator 30 includes a first switch 32 controlled by the control output 26, a first amplifier 34, and a capacitive pressure transducer fluidly couplable to the industrial process (not completely illustrated). The capacitive pressure transducer includes a pressure sensing capacitance 36 ($C_s$) that electrically couples in an amplifier feedback path 38 between a first amplifier output 40 and a first amplifier input 42. The first switch 32 connects across the pressure sensing capacitance 36. The first switch 32 is used to periodically re-zero the charge stored on pressure sensing capacitance 36. A non-inverting amplifier input 44 is coupled to the DC common 28.

A first reference capacitance 47 is insensitive to the pressure P and couples between the excitation clock 24 and the first amplifier input 42 as shown.

The sensing capacitance $C_s$ is modeled as:

$$C_S = \frac{C_O}{1 - \alpha P_N} \quad \text{Equation 0}$$

$$\text{for } 0 \leq P_N \leq 1$$

where $C_O$ is the sensor's rest capacitance at a normalized pressure $P_N=0$ and $\alpha$ is a gage factor. In Equation 0, the pressure is normalized to a value $P_N$ that ranges between 0 and 100% of a full scale pressure.

The arrangement in FIG. 1 provides an integrator output 40 ($V_O$) as shown in Equation 1:

$$V_O = (V_{EX})\frac{C_R}{C_S} = (V_{EX})(1 - \alpha P_N) \quad \text{Equation 1}$$

$$\text{for } C_R = C_O$$

where $V_O$ and $V_{EX}$ are peak-to-peak values. The pressure measurement device 10 in FIG. 1 thus has a desired linear transfer function between sensed fluid pressure P and its electrical output $V_O$. For convenience, $C_R$ can be selected such that $C_R=C_O$ such that the term $C_R/C_O$ drops out of various outputs functions such as Equation 1. One or more of the pressure sensing devices 10 shown in FIG. 1 can be incorporated into a larger circuit for absolute, gage or differential pressure sensing application. The pressure sensing device 10 can also be used without other circuitry to provide a pressure sensing output that is a rectangular wave with a peak-to-peak amplitude representing the sensed pressure.

Figure 2:
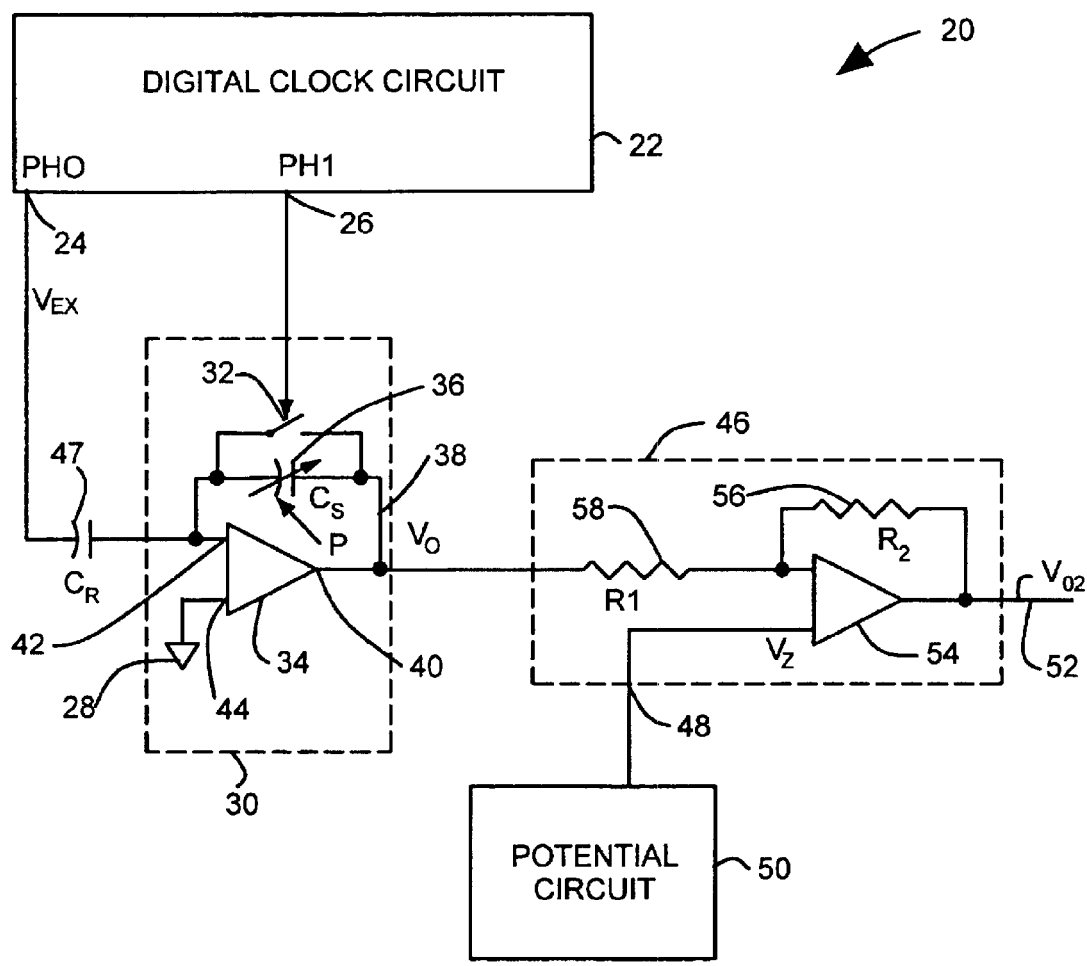
FIG. 2 illustrates a schematic diagram of an embodiment of a pressure measurement device.

FIG. 2 illustrates a schematic diagram of an embodiment of a pressure measurement device 20. The pressure measurement device 20 includes pressure measurement device 10 (illustrated in FIG. 1). Reference numbers used in FIG. 2 that are same as reference numbers used in FIG. 1 identify the same or similar features.

Pressure measurement device 20 can be used, for example, as a pressure transmitter for sensing absolute pressure P in an industrial process.

A summing circuit 46 receives the first amplifier output 40 ($V_O$) and a first reference potential 48 that is generated by a potential circuit 50. As explained in more detail below in connection with FIG. 5, the potential circuit 50 generates a potential that, in a preferred embodiment can be laser trimmed or manually adjusted prior to use of the pressure sensing device 20. Alternatively, one of the inputs of the summing circuit 46 can be connected to a potential output from a second integrator as shown in FIG. 3, 5, 6 or 7. The summing circuit 46 provides a summing circuit output 52 ($V_{O2}$) that represents the pressure P. The summing 15 circuit 46 includes an operational amplifier 54, a feedback resistor 56 ($R_2$), and an input resistor 58 (R1).

The summing circuit output 52 is as shown in Equation 2:

$$V_{O2} = \left[V_Z\left(1 + \frac{R_2}{R_1}\right) - V_{EX}\frac{C_R}{C_O}\frac{R_2}{R_1}\right] + (V_{EX})(\alpha)(P_N)\frac{C_R}{C_O}\left(\frac{R_2}{R_1}\right) \quad \text{Equation 2}$$

It can be seem from inspection of Equation 2 that the first term on the first line of Equation 1 includes no terms that are dependent on the sensed pressure P. It can also be seen that the second term on the second line is a convenient linear function of the normalized sensed pressure $P_N$. The pressure measurement device 20 in FIG. 2 thus has a desired linear transfer function between sensed fluid pressure P and its electrical output at 52. For computational convenience, the pressure sensor can be designed with $C_R=C_O$ such that the term $C_R/C_O$ can be left out of equations such as Equation 2.

Figure 3:
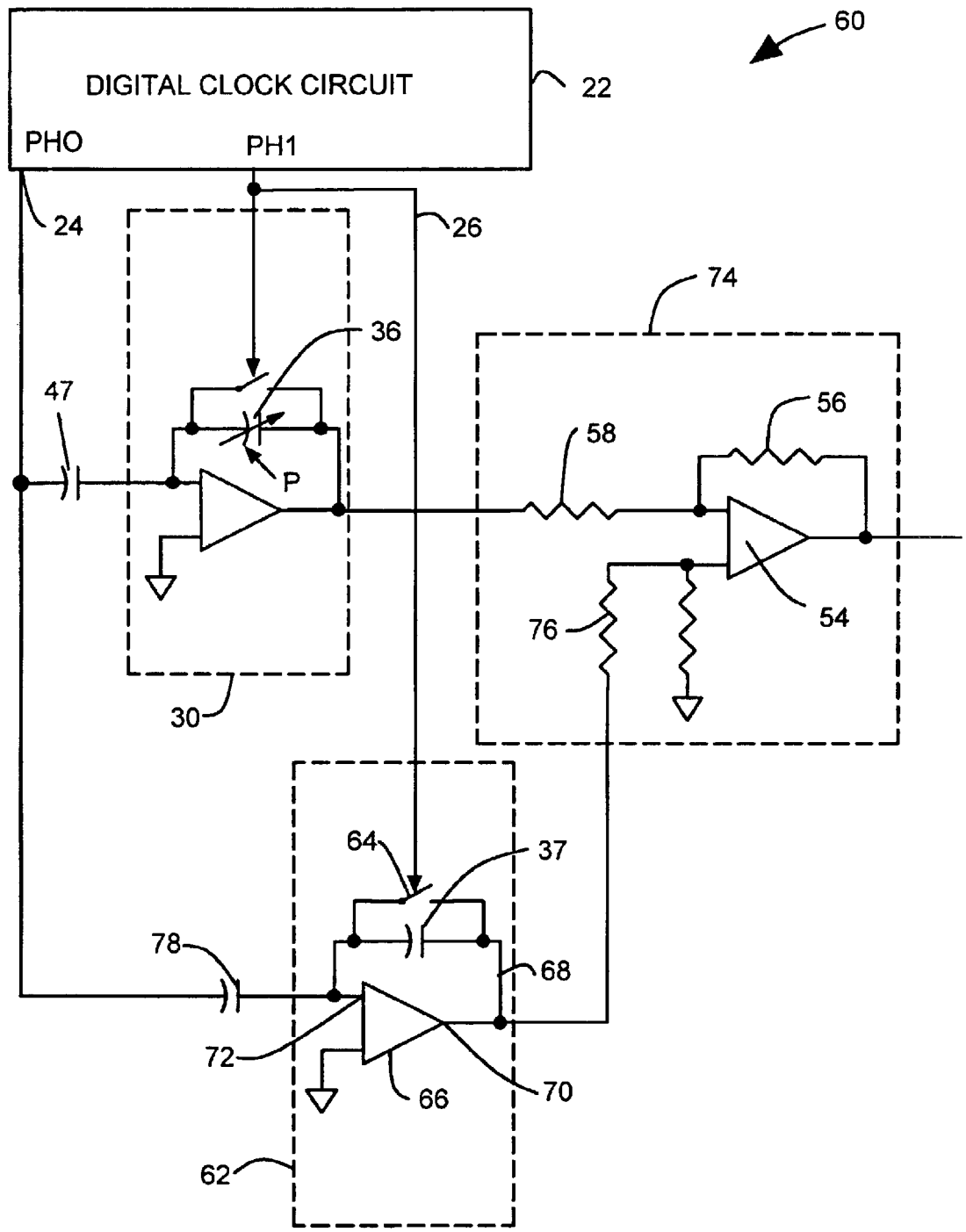
FIG. 3 illustrates a schematic of an embodiment of a pressure measurement device.

FIG. 3 illustrates a schematic of an embodiment of a pressure measurement device 60 that includes a pressure sensing capacitance 36 that senses the pressure P. The pressure measurement device 60 in FIG. 3 includes the pressure measurement device 20 in FIG. 2 and reference numbers used in FIG. 3 that are the same as reference numbers used in FIG. 2 identify the same or similar features.

Pressure measurement device 60 includes a second reference capacitance 78 that is insensitive to the pressure and that couples between the excitation clock 24 and a second amplifier input 72. Pressure measurement device 60 includes a second integrator 62 that includes a second switch 64 controlled by the control output 26, a second amplifier 66, and a third reference capacitance 37. The third reference capacitance 37 is fixed and insensitive to pressure and couples in a second amplifier feedback path 68 between a second amplifier output 70 and a second amplifier input 72. The second switch 64 connects across the third reference capacitance 37. The second amplifier output 70 couples to a summing circuit 74 via input resistor 76. The second integrator 62 serves a function in FIG. 3 that is equivalent to the function of circuit 50 in FIG. 2.

Figure 4:
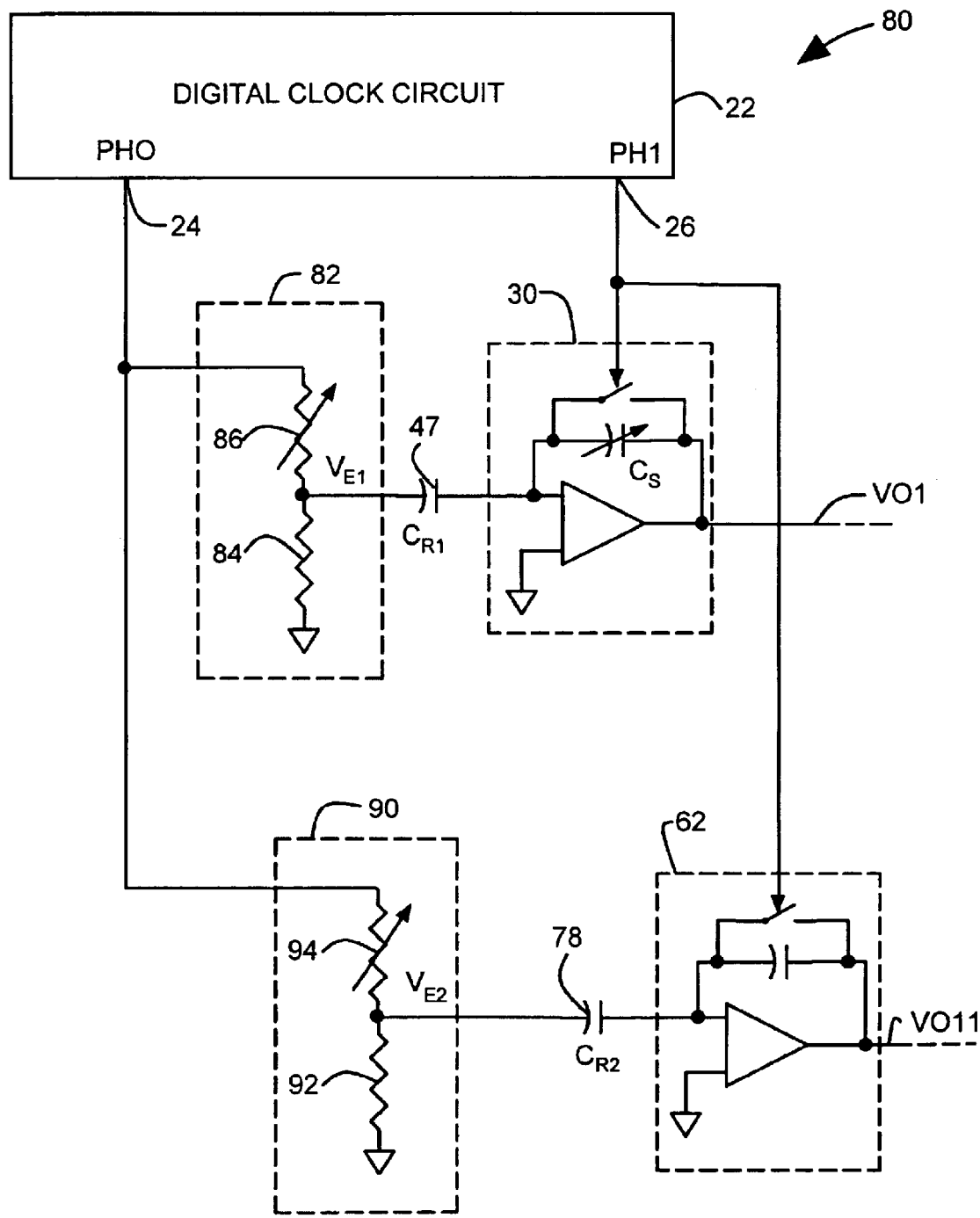
FIG. 4 illustrates a portion of a pressure measurement device that includes a voltage divider coupled between an excitation clock and a reference capacitor.

FIG. 4 illustrates a portion 80 of a pressure measurement device similar to the pressure measurement device 60 in FIG. 3, however in FIG. 4, a first voltage divider 82 is coupled between the excitation clock 24 and the first reference capacitor 47. The voltage divider 82 includes a fixed resistor 84 coupled between capacitance 47 and DC common, and also includes an adjustable resistor 86 coupled between capacitance 47 and the excitation clock 24. Adjustable resistor 86 can be a laser trimmable resistor or a manually adjustable potentiometer. The first voltage divider 82 provides a peak-to-peak voltage $V_{E1}$ to the capacitance 47.

A second voltage divider 90 is coupled between the excitation clock 24 and the second reference capacitance 78. The second voltage divider 90 includes a fixed resistor 92 coupled between second capacitance 78 and DC common, and also includes an adjustable resistor 94 coupled between capacitance 78 and the excitation clock 24.

In FIG. 4, the output of the first integrator 30 is shown in Equation 3:

$$V_{O1} = V_{E1}\frac{C_{R1}}{C_S} = V_{E1}(1 - \alpha P_{N1}) \quad \text{Equation 3}$$

with $C_{R1}=C_O$. The rate of change of the integrator output V01 with the normalized pressure $P_N$ is shown in Equation 4:

$$\frac{dV_{OI}}{dP_N} = -(V_{EI})(\alpha) \qquad \text{Equation 4}$$

It can be seen from equation 4 that the effective gage factor for the integrator 30 is $-(V_{E1})(\alpha)$. Since the voltage divider 82 can be adjusted to vary VE1, it can be seen that the adjustment of the voltage divider 82 allows for adjustment of the effective gage factor of the first integrator 30. This arrangement permits matching the effective gage factor of the first integrator 30 to the second integrator 62. If desired, the second voltage divider 90 can also be used to provide additional adjustment to $V_{E2}$ to achieve effective matching. If the capacitance in the feedback loop of the second integrator 62 is selected to be a pressure sensor, the circuit 80 is used for differential pressure sensing, and the adjustments provided by the voltage dividers 82, 90 can be used to adjust the gage factors of each channel to cancel out common mode error (sensitivity to line pressure) in the summing circuit output.

Figure 5:
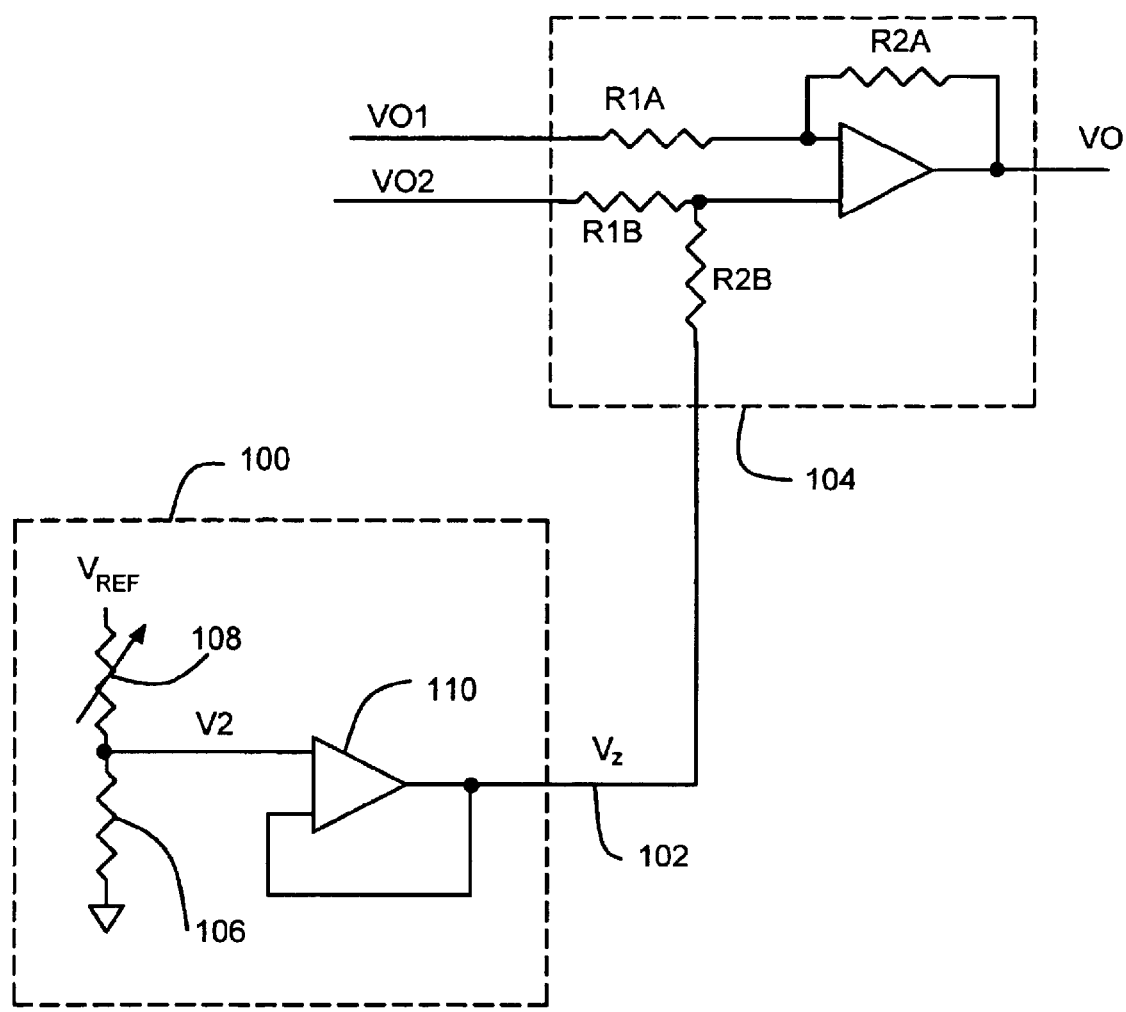
FIG. 5 illustrates an example of a potential circuit that generates a fixed potential that can be adjusted prior to use of a pressure sensing device in which it is used.

FIG. 5 illustrates an example of an adjustable potential circuit 100 that generates a fixed potential that can be laser trimmed or manually adjusted prior to use of a pressure sensing device in which it is used. The potential circuit 100 can be adapted, for example, to the circuit 60 shown in FIG. 3 as an alternate way to provide a potential analagous to the potential provided by the integrator 62 in FIG. 3. The adjustable potential circuit 100 generates a reference potential 102 ($V_Z$) that is coupled to a summing circuit 104. The adjustable potential circuit 100 includes a resistive voltage divider comprising a fixed resistor 106 and an adjustable resistor 108. Resistor 108 can be a laser trimmable resistor or a manually adjustable pot that is adjusted during manufacture. A voltage V2 generated by the resistive voltage divider is coupled to a buffer amplifier 110 that, in turn generates the reference potential 102. In FIG. 5, the summing circuit output voltage VO is given by Equation 5:

$$V_O = V_Z + \frac{R_2}{R_1}(V_{O2} - V_{OI}) \qquad \text{Equation 5}$$

It can be seen from Equation 5 that the adjustable potential circuit 100 allows for adjusting $V_Z$ to provide an effective zero adjustment of the summing circuit output $V_O$. In the summing circuit 104, preferably resistance R1A=R1B=R1, and resistance R2A=R2B=R2.

An adjustable potential circuit 100 can be alternatively implemented using an analog switchable divider, a voltage controlled resistance, a capacitance divider or a programmable gain amplifier.

In the embodiments described below in FIGS. 6–11, a method and apparatus for sensing differential pressure in a differential pressure measurement device are disclosed. Two integrator channels are provided and each integrator channel includes a pressure sensor that separately sense one of two pressures (P1, P2). The two integrator channels are matched in terms of a ratio of integrator output to pressure input. The matching of the integrator channels is achieved by matching capacitance ratios in a first channel with capacitance ratios in a second channel. The differential pressure measurement device provides speed and accuracy without the added cost of an embedded microprocessor or additional complex circuitry.

Figure 6:
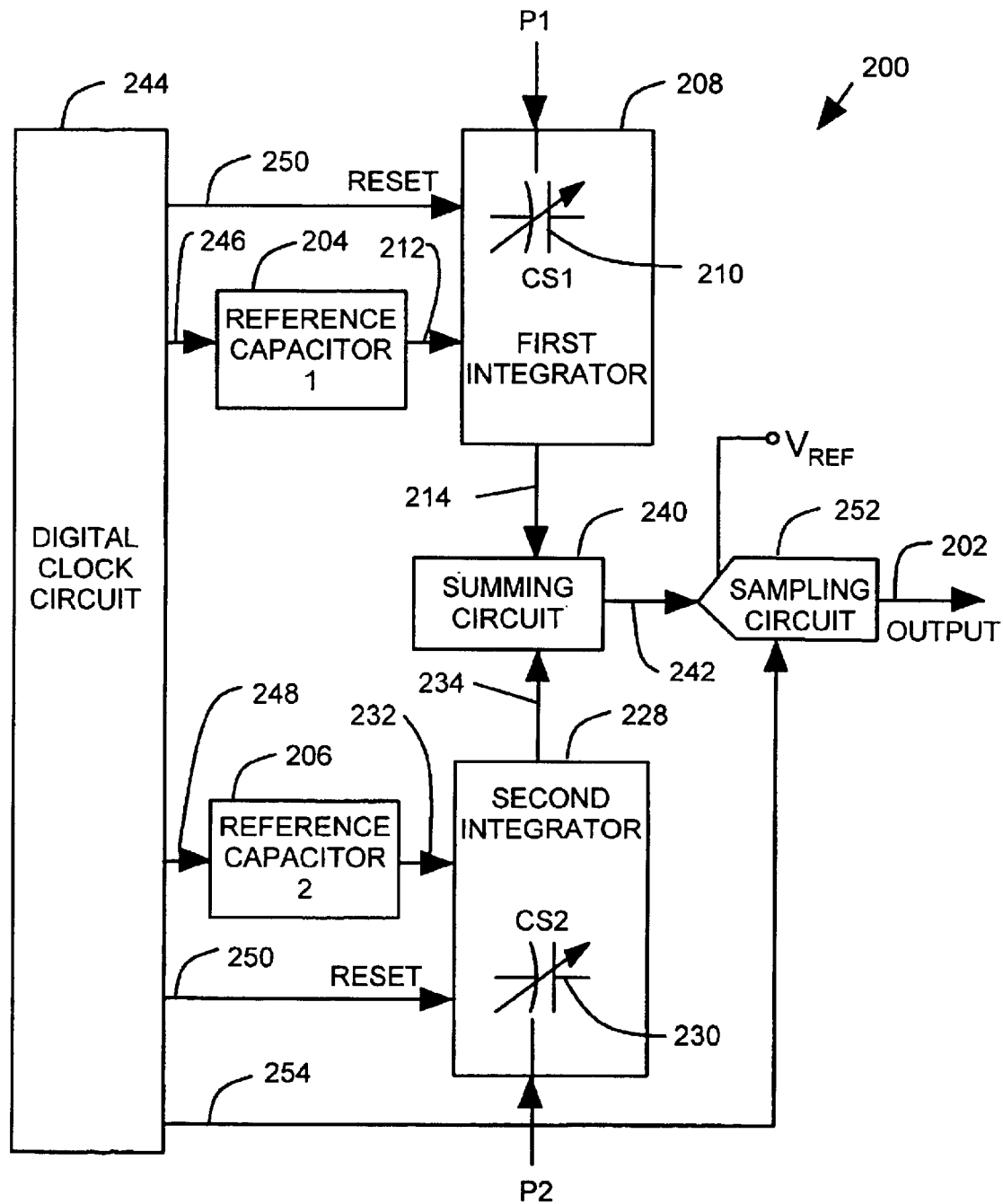
FIG. 6 illustrates a block diagram of an embodiment of a pressure measurement device.

FIG. 6 illustrates a block diagram of an embodiment of a pressure measurement device 200. Pressure measurement device 200 is a differential pressure measurement device that senses pressures P1 and P2 and provides a measurement device outputs 242, 202 each representing differential pressure (P1–P2).

The measurement device 200 includes a first reference capacitance 204 and a second reference capacitance 206. Capacitances 204, 206 (also called reference capacitors 204, 206) each have a capacitance value that is not sensitive to the sensed pressure. Preferably, the reference capacitances 204, 206 have temperature characteristics that are similar to the temperature characteristics of sensing capacitances 210, 230 so that the measurement device outputs 242, 202 have reduced temperature sensitivity. A digital clock circuit 244 in the measurement device 200 couples first and second excitation clocks 246, 248 to the first and second reference capacitors 204, 206, respectively. Preferably, the digital clock circuit 244 also couples a reset clock 250 to the first and second integrators 208, 228.

The first integrator 208 includes the first pressure sensing capacitance 210 that senses process pressure P1. The first integrator 208 has a first input 212 coupled to the first reference capacitance 204, and a first integrator output 214 that varies as a function of a first ratio K1 of the first reference capacitance 204 to the first pressure sensing capacitance 210.

The second integrator 228 includes the second pressure sensing capacitance 230 that senses process pressure P2. The second integrator 228 has a second input 232 coupled to the second reference capacitance 206 and a second integrator output 234 that varies as a function of a second ratio K2 of the second reference capacitance 206 to the second pressure sensing capacitance 230. The first ratio K1 is matched to the second ratio K2 when a first sensed pressure P1 is substantially equal to a second sensed pressure P2 over the pressure range of the measurement device 200.

Each of the integrators 208, 228 integrates charge received at its respective input 212, 232 and provides an integrator output 214, 234 representative of a charge quantity or charge packet received from the input 212, 232. The pressure sensing capacitances 210, 230 are used as integrating capacitors.

In one preferred arrangement, the first and second pressure sensing capacitances 210, 230 comprise matched absolute pressure sensors. Pressure sensing capacitances 210, 230, however, can also be matched gage pressure sensors.

In another preferred arrangement, the first reference capacitance 204 is matched to the second reference capacitance 206. In a still further preferred arrangement, the first pressure sensing capacitance 210 is matched to the second pressure sensing capacitance 230 when the first sensed pressure is substantially equal to the second sensed pressure over a pressure range of the pressure measurement device 200.

The term "matched" as used in this application is defined to mean that a first component has a parameter that differs from the same parameter of a corresponding second component by, for example, less than 0.5%.

A summing circuit 240 in the measurement device 200 receives the first and second integrator outputs 214, 234 and provides the summing circuit output 242. The summing circuit output 242 has a peak-to-peak amplitude representing differential pressure between the first and second sensed pressures P1, P2. The summing circuit output 242 is substantially a square wave with a controlled duty cycle. The summing circuit output 242 has an average DC value that is also representative of differential pressure between the first and second sensed pressures P1, P2.

In one preferred arrangement, a sampling circuit 252, for a example a sigma delta modulator, receives the summing circuit output 242 and provides a digital transmitter output 202 representative of the differential pressure. The digital output 202 can be converted to an analog 4–20 mA output if desired. In another preferred arrangement, a sampling circuit 252 is not used, and the summing circuit output 242 couples directly to an analog 4–20 mA output circuit (not illustrated). In other words, use of the sampling circuit 252 is optional. The summing circuit can couple directly to a two-wire, 4–20 mA analog transmitter output circuit that generates an transmitter output representative of the differential pressure.

Preferably, the digital clock circuit 244 provides a sampling clock 254 to the sampling circuit 252. The sampling circuit 252 samples the summing circuit output at sample times (also called sample windows) when the amplitude representing differential pressure is present at the summing circuit output 242.

The circuit 200 is explained in more detail below in connection with examples illustrated in FIGS. 7–11.

Figure 7:
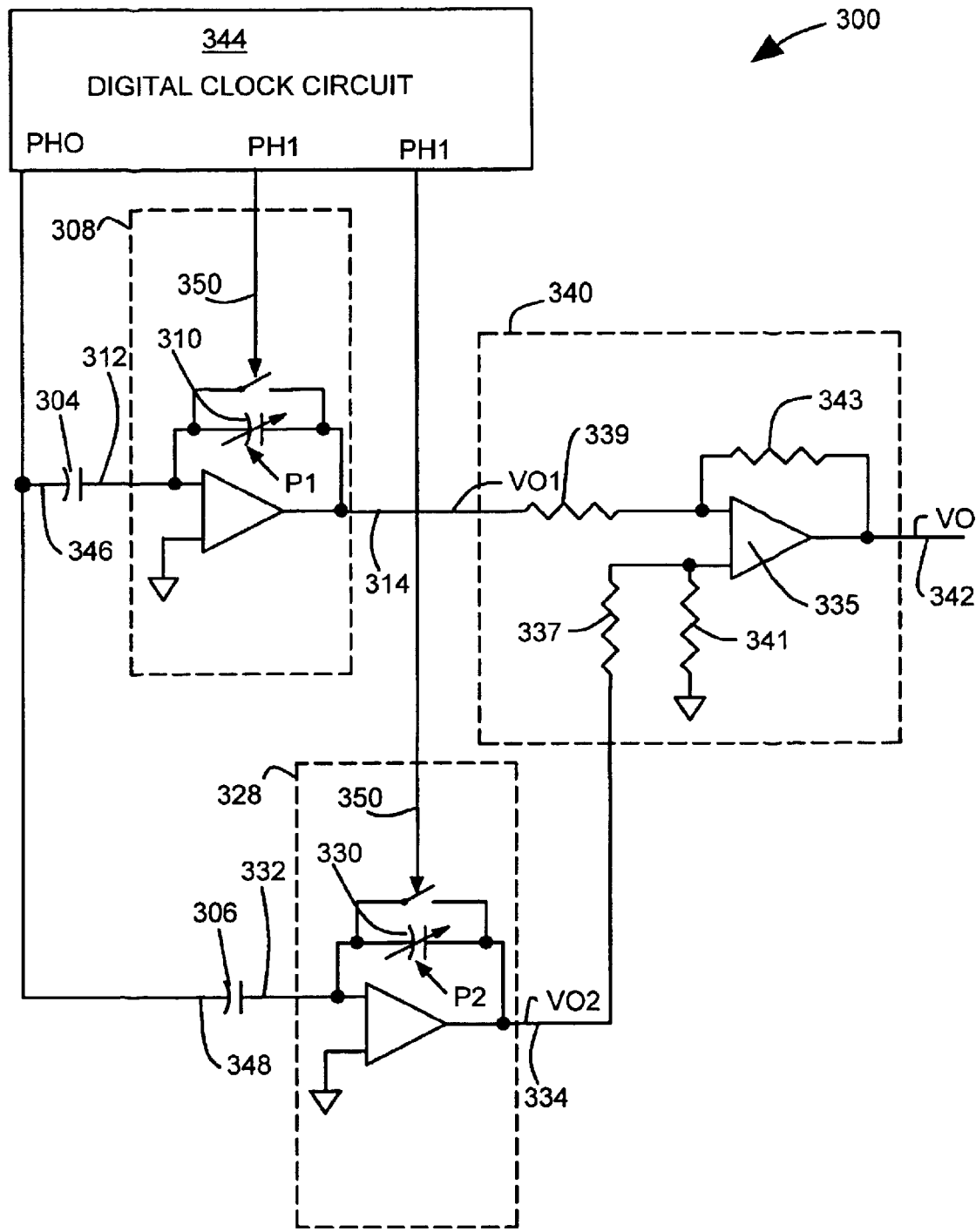
FIG. 7 illustrates a schematic diagram of an embodiment of a pressure measurement device.

FIG. 7 illustrates a schematic diagram of an embodiment of a pressure measurement device 300. Pressure measurement device 300 is a differential pressure measurement device that senses pressures P1 and P2 and provides an output (VO) 342 representing differential pressure ±(P1−P2). The measurement device 300 is similar to the measurement device 200 illustrated in FIG. 6 and includes a first reference capacitance 304 and a second reference capacitance 306. The measurement device 300 shown in FIG. 7 does not include a sampling circuit such as sampling circuit 252 shown in FIG. 6.

A digital clock circuit 344 in the measurement device 300 couples first and second excitation clocks 346, 348 to the first and second reference capacitors 304, 306, respectively. As can be seen in FIG. 7, the first and second excitation clocks are the same signal PHO, and thus first excitation clock 346 is substantially in phase with the second excitation clock 348.

The digital clock circuit 344 also couples a reset clock PH1 350 to first and second charge integrators 308, 328. The digital clock circuit 344 and outputs PHO, PH1 are explained in more detail below in connection with a timing diagram in FIG. 8.

The first integrator 308 includes a first pressure sensing capacitance 310 that senses pressure P1. The first integrator 308 has a first input 312 coupled to the first reference capacitance 304, and has a first integrator output 314. The second integrator 328 includes a second pressure sensing capacitance 330. The second integrator 328 has a second input 332 coupled to the second reference capacitance 306 and has a second integrator output 334.

Each of the first and second integrators 308, 328 includes a differential operational amplifier with a pressure sensing capacitance 310, 330 in a feedback loop between the operational amplifier's output and its inverting input as illustrated in FIG. 7. A solid state switch coupled across each pressure sensing capacitance 310, 330 is used to reset the charge stored on the pressure sensing capacitance to zero during a reset interval at the outset of each integration cycle. When the excitation PHO changes state after the reset interval, charge is coupled through the reference capacitor 304, 306 to the integrators and stored on the pressure sensing capacitor 310, 330. The output voltage of the operational amplifier after the integration is completed is a function of the ratio of the reference capacitance to the sensing capacitance.

A summing circuit 340 in the measurement device 300 receives the first and second integrator outputs 314, 334 and provides the summing circuit output 342 that has an amplitude that represents differential pressure (P2−P1). The summing circuit 340 comprises a differential amplifier as illustrated, and the summing circuit output amplitude represents a difference between the first and second integrator outputs.

The differential amplifier in the summing circuit comprises an operational amplifier 335 providing the summing output 342, two input resistors 337, 339 coupling to the inputs of the operational amplifier 335, a feedback resistor 343 coupled between the operational amplifier's output and its inverting input, and a bias resistor 341 coupling a non-inverting input of the operational amplifier 335 to dc common.

The first and second integrator outputs 314, 334 as well as the summing circuit output 342 are explained in more detail below in connection with FIG. 8.

Figure 8:
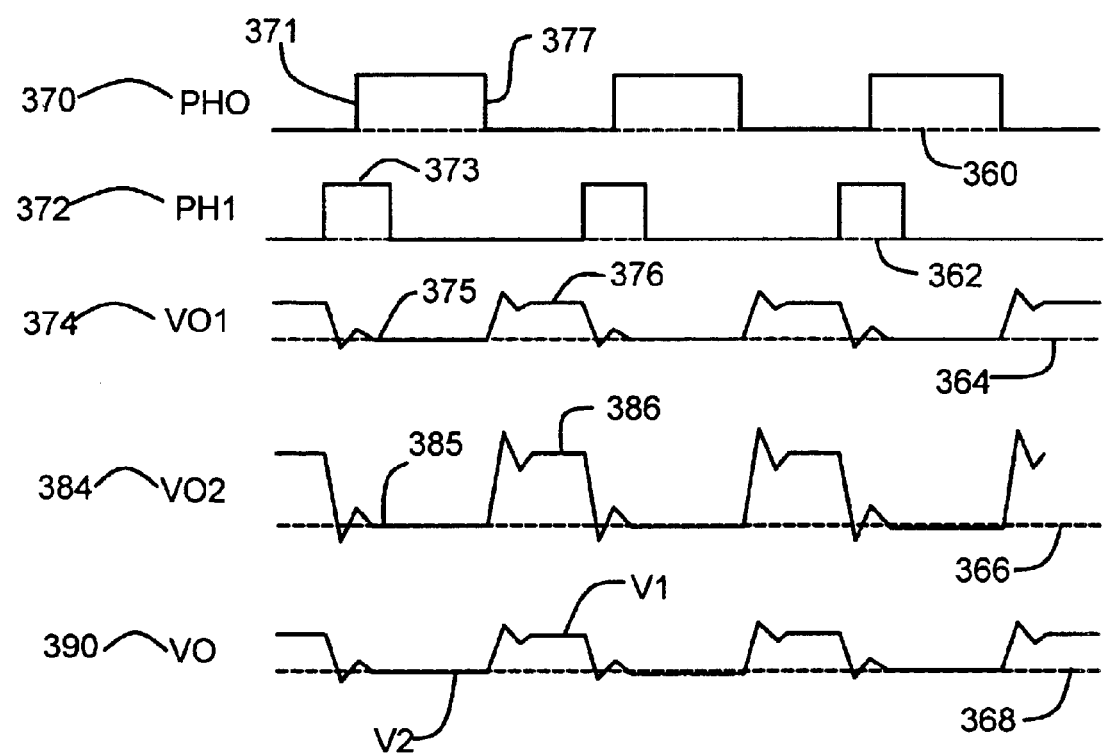
FIG. 8 illustrates a timing diagram for the circuit illustrated in FIG. 7.

FIG. 8 illustrates a timing diagram for the pressure measurement device 300 illustrated in FIG. 7. In FIG. 8, the horizontal axes 360, 362, 364, 366, 368 represent time. The vertical direction represents amplitude for each of the signals PHO, PH1, VO1, VO2, VO in FIG. 7.

The excitation clock PHO is illustrated at 370 and is approximately a square wave. The reset clock PH1 is illustrated at 372. The reset clock PH1 is high at 373 during each positive-going transition 371 of the excitation clock PHO. The PH1 pulse overlaps the leading edge of the PHO pulse.

The first integrator output VO1 is illustrated at 374. As can be seen from FIG. 8, the first integrator output VO1 is driven to a zero or reset as illustrated at 375 during each period 373 that the reset clock PH1 is high. The first integrator output VO1 rises to a non-zero level 376 after each negative-going transition 377 of the excitation clock PHO.

The second integrator output VO2 is illustrated at 384. As can be seen from FIG. 8, the second integrator output VO2 is driven to a zero or reset as illustrated at 385 during each period 373 that the reset clock PH1 is high. The second integrator output VO2 rises to a non-zero level 386 after each negative-going transition 377 of the excitation clock PHO.

The summing output VO is illustrated at 390. The summing output VO includes an amplitude (V1−V2), that optionally can be sampled, and that is substantially proportional to differential pressure (P2−P1).

Figure 9:
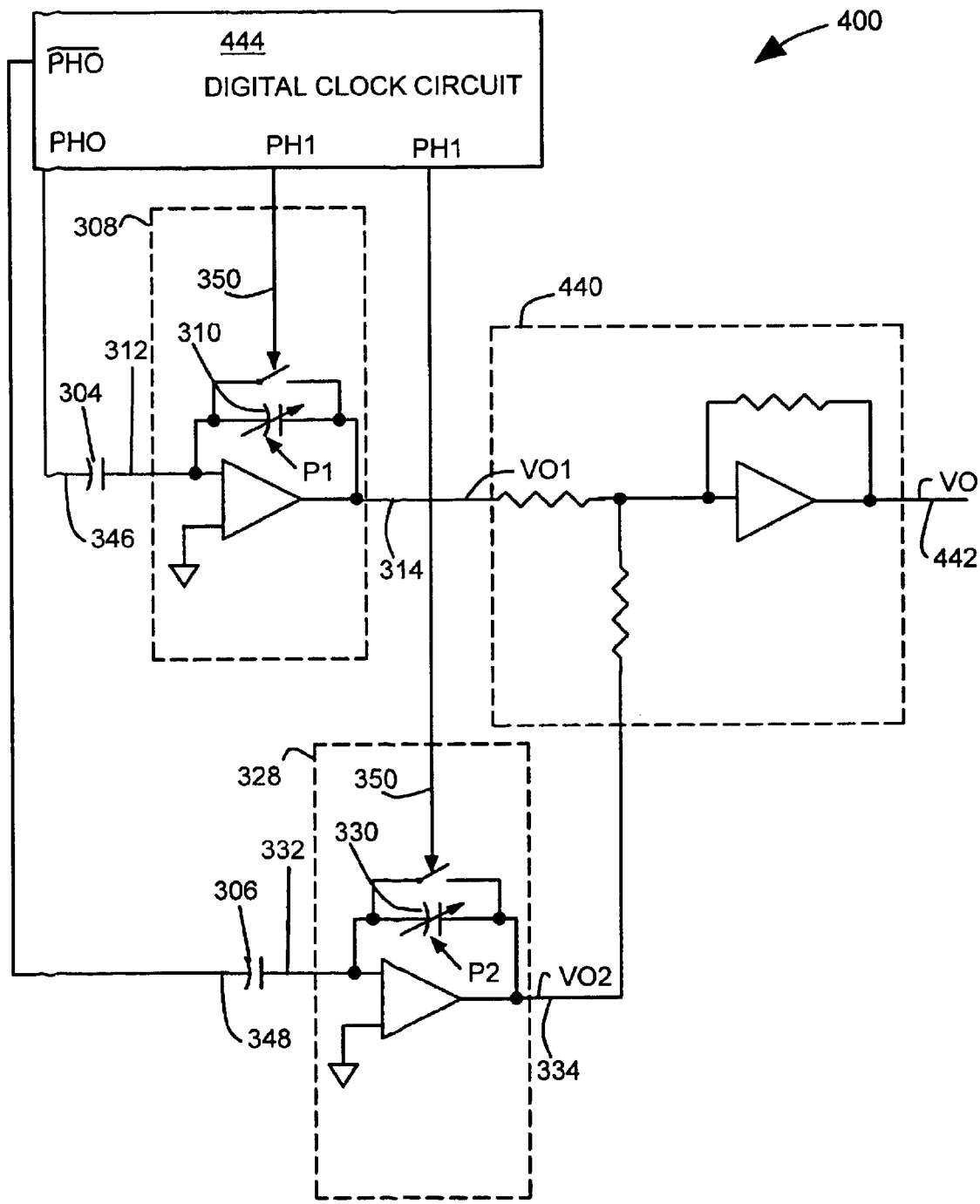
FIG. 9 illustrates a schematic circuit diagram of an embodiment of a pressure measurement device.

FIG. 9 illustrates a schematic diagram of an embodiment of a pressure measurement device 400. Pressure measurement device 400 is a differential pressure measurement device that senses pressures P1 and P2 and provides an output (VO) 442 representing differential pressure ±(P1−P2). The measurement device 400 is similar to the measurement device 300 illustrated in FIG. 7. Reference numerals used in FIG. 9 that are the same as reference numerals used in FIG. 7 identify the same or similar features. In the circuit 300 illustrated in FIG. 7, the digital clock circuit 344 has an output PHO that is coupled to both the first and second reference capacitors 304, 306, and further the summing circuit 340 provides an summing circuit output that represents a difference between integrator outputs 314, 334. In the circuit 400 illustrated in FIG. 9, the digital clock circuit 444 has logically complementary outputs PHO and /PHO (/PHO is inverted with respect to PHO). In FIG. 9, PHO couples to the first reference capacitor 304, and /PHO couples to the second reference capacitor 306. In FIG. 9, the summing circuit 440 comprises a summing amplifier and provides a summing circuit output 442 that represents a sum of integrator outputs 314, 334.

In comparison with circuit 300 in FIG. 7, the circuit 400 in FIG. 9 has an inverted excitation provided to the second reference capacitor 306, and the configuration of summing circuit 440 forms a sum rather than a difference, effectively canceling out the effects of the excitation inversion at the summing circuit output 442. In both circuits 300 and 400, the output represents a pressure difference (P2−P1). The operation of the outputs PHO, /PHO, PH1 of the digital clock circuit 444 and the outputs VO1, VO2 and VO in FIG. 9 are explained in more detail below in connection with FIG. 10.

Figure 10:
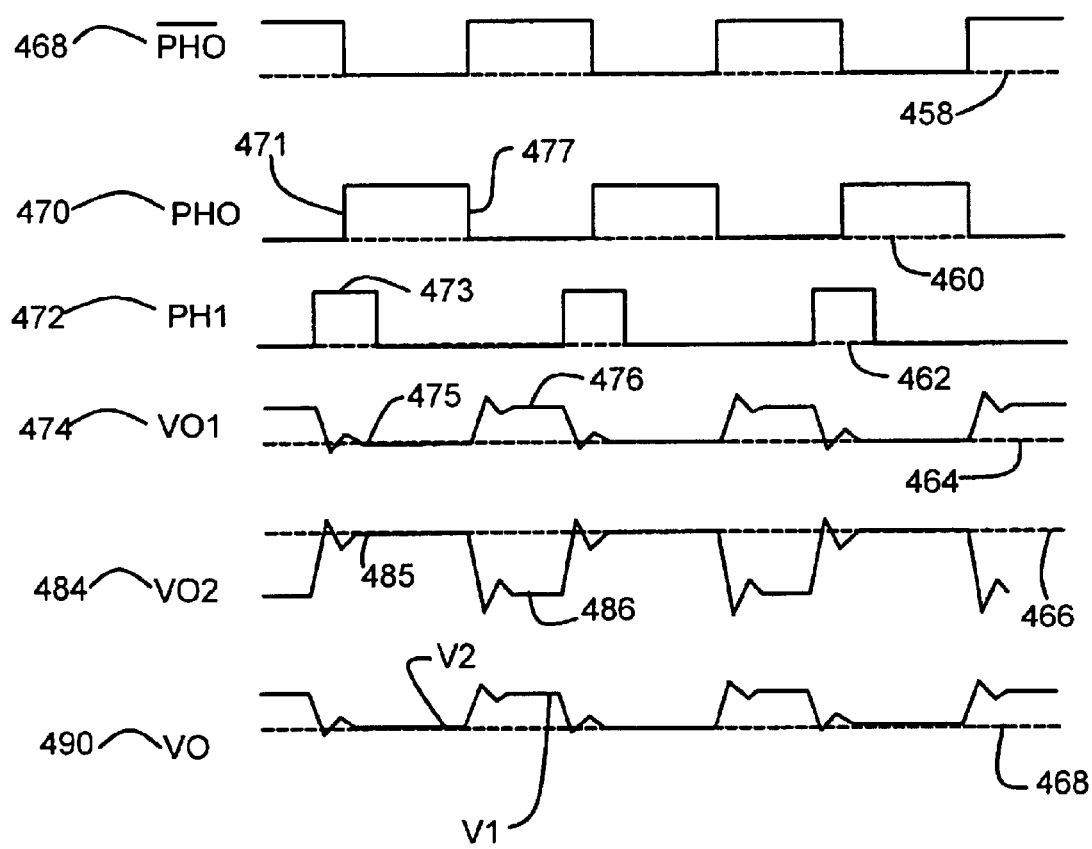
FIG. 10 illustrates a timing diagram for the circuit illustrated in FIG. 9.

FIG. 10 illustrates a timing diagram for the pressure measurement device 400 illustrated in FIG. 9. In FIG. 10, the horizontal axes 458, 460, 462, 464, 466, 468 represent time. The vertical direction represents amplitude for each of the signals PHO, /PHO, PH1, VO1, VO2, VO in FIG. 9.

A first excitation clock PHO is illustrated at 470 and is approximately a square wave. A second excitation clock /PHO is 10 illustrated at 468 and is a logical inverse of the first excitation waveform 470. The second excitation clock /PHO is out of phase with the first excitation clock PHO. A reset clock PH1 is illustrated at 472. The reset clock PH1 is high at 473 during each positive-going transition 471 of the first excitation clock PHO and during each negative-going transition of the second excitation clock /PHO.

The first integrator output VO1 is illustrated at 474. As can be seen from FIG. 10, the first integrator output VO1 is driven to a zero or reset as illustrated at 475 during each period 473 that the reset clock PH1 is high. The first integrator output VO1 rises to a non-zero level 476 after each negative-going transition 477 of the excitation clock PHO.

The second integrator output VO2 is illustrated at 484. As can be seen from FIG. 10, the second integrator output VO2 is driven to a zero or reset as illustrated at 485 during each period 473 that the reset clock PH1 is high. The second integrator output VO2 drops to a non-zero level 486 after each negative-going transition 477 of the excitation clock PHO.

The summing output VO is illustrated at 490. The summing output VO includes an amplitude (V1−V2) that can be sampled and that is substantially proportional to differential pressure (P2−P1).

Figure 11:
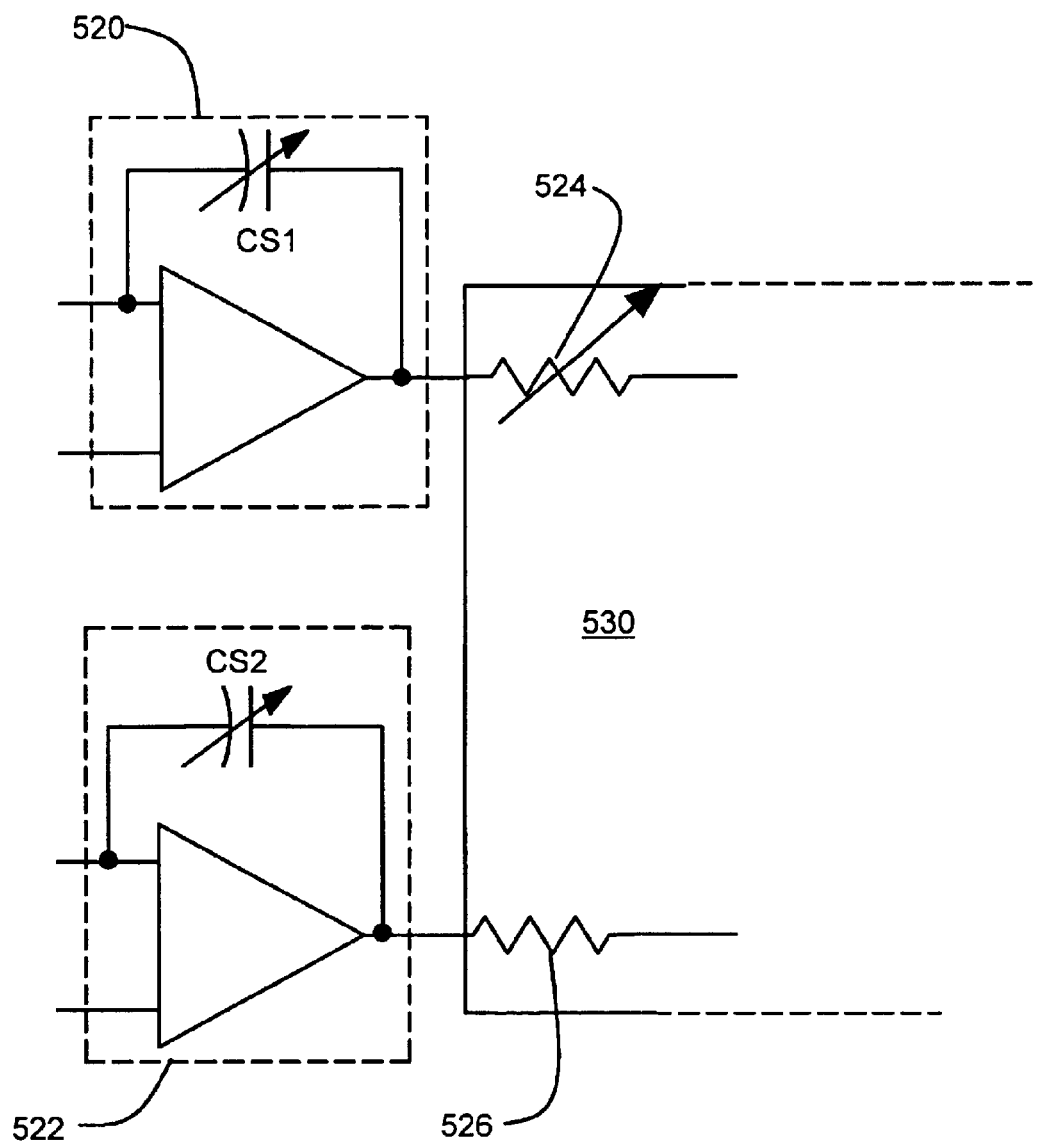
FIG. 11 illustrates compensation for improving matching of gain factors of pressure sensors.

FIG. 11 illustrates compensation for improving matching of gain factors of pressure sensing capacitances. FIG. 11 illustrates first and second integrators 520, 522 coupled to a summing circuit 530. The arrangement illustrated in FIG. 11 is similar to the arrangement illustrated in FIGS. 6, 7 and 9. The summing circuit 530 includes two input resistors 524, 526. Pressure sensing capacitances CS1 and CS2 are matched sensors, however, there is an extremely small difference between the gage factor of the two pressure sensing capacitances CS1 and CS2 over the pressure range. The gage factor of a capacitive pressure sensor is a ratio of change of capacitance divided by a change in applied pressure that causes the change in capacitance. In order to improve the gage factor match between the first and second sensing capacitances, one or both of the input resistors 524, 526 are laser trimmed during a factory calibration process to improve matching of the effective gage factors of the first and second capacitances.

For a capacitive pressure sensor, the sensor capacitance is not linearly related to the sensed pressure, and in general, the slope of a characteristic curve is shown by Equation 6:

$$\frac{\Delta C_S}{\Delta P_N} = f(P_N) \neq \text{CONSTANT} \qquad \text{Equation 6}$$

However, the circuits described above in connection with FIGS. 1–11 provide an integrator output of the form (CR/CS). For this integrator output, the slope of a characteristic line is shown in Equation 7:

$$\frac{\Delta\left(\frac{C_R}{C_S}\right)}{\Delta P_N} = \alpha = \text{CONSTANT} \qquad \text{Equation 7}$$

It can be seen from Equation 7 that the integrator circuits described above in connection with FIGS. 1–11, which have a sensing capacitance CS in a feedback path around an integrator amplifier, and a capacitance CR that is insensitive to pressure coupled between the amplifier input and an excitation source, produce a highly desirable linear characteristic. No linearization by a microprocessor is needed; and no complex analog circuits need to be added to provide linearization.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the pressure measurement device while maintaining substantially the same functionality without departing from the scope and spirit of the present invention. The teachings of the present invention can be applied to other differential pressure sensing instruments without departing from the scope of the present invention.

What is claimed is:

1. A pressure measurement device for sensing pressure in an industrial process, comprising:

a digital clock circuit that provides excitation clock pulses, and control output pulses that are out of phase with the excitation clock pulses;

a first integrator including a first switch controlled by the control output pulses, a first amplifier, and a capacitive pressure transducer fluidly couplable to the industrial process and having a first pressure sensing capacitance electrically coupled in an amplifier feedback path between a first amplifier output and a first amplifier input, the first switch connecting across the first pressure sensing capacitance; the amplifier providing an output representative of the pressure, and the control output pulses resetting the first amplifier output;

a first reference capacitance that is insensitive to the pressure and that couples the excitation clock pulses to the first amplifier input; and a summing circuit receiving the first amplifier output that is reset by the control output pulses and a first reference potential; the summing circuit providing a summing circuit output representing the pressure.

2. The pressure measurement device of claim 1, further comprising:
a first voltage divider coupling the excitation clock pulses to the first reference capacitor, the first voltage divider setting a first effective gage factor.

3. The pressure measurement device of claim 2, further comprising:
a second voltage divider coupling the excitation clock pulses to a second reference capacitor.

4. The pressure measurement device of claim 2 wherein the first voltage divider comprises a laser trimmable resistor.

5. The pressure measurement device of claim 2 wherein the first voltage divider comprises a manually adjustable potentiometer.

6. The pressure measurement device of claim 1, further comprising:
an adjustable potential circuit providing the first reference potential, the adjustable potential circuit setting a first effective gage factor.

7. The pressure measurement device of claim 6 wherein the adjustable potential circuit includes a laser trimmable resistor.

8. The pressure measurement device of claim 6 wherein the adjustable potential circuit includes a manually adjustable potentiometer.

9. The pressure measurement device of claim 6 wherein the adjustable potential circuit includes an analog switchable divider.

10. The pressure measurement device of claim 6 wherein the adjustable potential circuit includes a voltage controlled resistance.

11. The pressure measurement device of claim 6 wherein the adjustable potential circuit includes a capacitance divider.

12. The pressure measurement device of claim 6 wherein the adjustable potential circuit includes a programmable gain amplifier.

13. A pressure measurement device for sensing pressure in an industrial process, comprising:
a digital clock circuit that provides an excitation clock and a control output;
a first integrator including a first switch controlled by the control output, a first amplifier, and a capacitive pressure transducer fluidly couplable to the industrial process and having a first pressure sensing capacitance electrically coupled in an amplifier feedback path between a first amplifier output and a first amplifier input, the first switch connecting across the first pressure sensing capacitance; the amplifier providing an output representative of the pressure;
a first reference capacitance that is insensitive to the pressure and that couples between the excitation clock and the first amplifier input;
a summing circuit receiving the first amplifier output and a first reference potential; the summing circuit providing a summing circuit output representing the pressure; and
a second integrator including a second switch controlled by the control output, a second amplifier, and a second pressure sensing capacitance coupled in a second amplifier feedback path between a second amplifier output and a second amplifier input, the second switch connecting across the second pressure sensing capacitance and the second amplifier output coupling to the summing circuit; and
a second reference capacitance that is insensitive to the pressure and that couples between the excitation clock and the second amplifier input.

14. A differential pressure measurement device, comprising:
first and second reference capacitances;
a first integrator including a first pressure sensing capacitance, the first integrator having a first input coupled to the first reference capacitance, and a first integrator output that varies as a function of a first ratio of the first reference capacitance to the first pressure sensing capacitance;
a second integrator including a second pressure sensing capacitance, the second integrator having a second input coupled to the second reference capacitance, and a second integrator output that varies as a function of a second ratio of the second reference capacitance to the second pressure sensing capacitance;
a summing circuit receiving the first and second integrator outputs and providing a summing circuit output with an amplitude representing differential pressure between the first and second sensed pressures;
a digital clock circuit coupling first and second excitation clocks to the first and second reference capacitors, respectively; and
the first ratio is matched to the second ratio when a first sensed pressure is substantially equal to a second sensed pressure over a pressure range of the differential pressure measurement device.

15. The differential pressure measurement device of claim 14 wherein the first reference capacitance is matched to the second reference capacitance.

16. The differential pressure measurement device of claim 14 wherein the first pressure sensing capacitance is matched to the second pressure sensing capacitance when the first sensed pressure is substantially equal to the second sensed pressure over the pressure range of the differential pressure measurement device.

17. The differential pressure measurement device of claim 14 wherein the first and second pressure sensing capacitances sense first and second absolute pressures, respectively.

18. The differential pressure measurement device of claim 14 wherein the digital clock circuit couples a reset clock to the first and second charge integrator circuits.

19. The differential pressure measurement device of claim 14 further comprising a sampling circuit that receives the summing circuit output and provides a two-wire, 4–20 mA analog transmitter output representative of the differential pressure.

20. The differential pressure measurement device of claim 19 wherein the digital clock circuit generates a sampling clock phase, and the sampling clock phase is coupled to the sampling circuit.

21. The differential pressure measurement device of claim 14 further comprising a sampling circuit that receives the summing circuit output and provides a digital measurement device output representative of the differential pressure.

22. The differential pressure measurement device of claim 14 wherein the first excitation clock is inverted relative the second excitation clock.

23. The differential pressure measurement device of claim 22 wherein the summing circuit comprises a differential amplifier, and the summing circuit output represents a difference between the first and second integrator outputs.

24. The differential pressure measurement device of claim 14 wherein the second excitation clock is out of phase with the first excitation clock.

25. The differential pressure measurement device of claim 24 wherein the summing circuit comprises a differential amplifier, and the summing circuit output represents a sum of the first and second integrator outputs.

26. The differential pressure measurement device of claim 14 wherein the summing circuit comprises a first input resistance coupled to the first integrator circuit, and comprises a second input resistance coupled to the second integrator circuit, and a resistance selected from the group of the first input resistor and the second input resistor is a trimmed resistance.

27. The differential pressure measurement device of claim 14 wherein the summing circuit couples directly to a two-wire, 4–20 mA analog transmitter output circuit that generates an transmitter output representative of the differential pressure.

* * * * *